(12) United States Patent
Sundararaj et al.

(10) Patent No.: US 10,662,863 B1
(45) Date of Patent: May 26, 2020

(54) SYSTEMS AND METHODS FOR MONITORING THE PERFORMANCE OF A HEAT EXCHANGER

(71) Applicant: Caterpillar Inc., Deerfield, IL (US)

(72) Inventors: Vivek Sundararaj, Peoria, IL (US); Haolun Fan, Peoria, IL (US); Yue Wang, Savoy, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/196,661

(22) Filed: Nov. 20, 2018

(51) Int. Cl.
*F01P 11/16* (2006.01)
*F02D 41/22* (2006.01)

(52) U.S. Cl.
CPC ........... *F01P 11/16* (2013.01); *F02D 41/222* (2013.01); *F01P 2025/13* (2013.01); *F01P 2025/34* (2013.01); *F01P 2025/36* (2013.01)

(58) Field of Classification Search
CPC .... F01P 11/16; F01P 2025/13; F01P 2025/34; F01P 2025/36; F02D 41/222
See application file for complete search history.

(56) References Cited

U.S. PATENT DOCUMENTS

| | | | | |
|---|---|---|---|---|
| 5,422,014 A * | 6/1995 | Allen | ................. | C02F 1/008 210/139 |
| 6,962,435 B2 * | 11/2005 | Stenestam | ........... | G01R 31/3274 374/152 |
| 8,370,052 B2 | 2/2013 | Lin et al. | | |
| 9,151,211 B2 | 10/2015 | Anilovich et al. | | |
| 9,790,842 B2 | 10/2017 | Dudar et al. | | |
| 2001/0029907 A1 * | 10/2001 | Algrain | ..................... | F01P 3/18 123/41.29 |
| 2006/0196451 A1 | 9/2006 | Braun et al. | | |
| 2010/0095909 A1 * | 4/2010 | Lin | .......... | F01P 11/16 123/41.02 |
| 2013/0019819 A1 * | 1/2013 | Dye | ........ | F01P 3/207 123/41.09 |
| 2014/0288675 A1 | 9/2014 | Fujiwara et al. | | |

FOREIGN PATENT DOCUMENTS

FR              2697869        5/1994

\* cited by examiner

*Primary Examiner* — Omar S Khan
(74) *Attorney, Agent, or Firm* — Lee & Hayes, PLLC

(57) ABSTRACT

A machine has a power source and a cooling system configured to circulate coolant between the power source and a heat exchanger. The cooling system has a first sensor configured to sense an ambient temperature and provide a first signal indicative of the ambient temperature and a second sensor configured to sense an actual temperature of the coolant and to provide a second signal indicative of the actual coolant temperature. The cooling system has a controller in communication with the first and second sensors to receive the first and second signals. The controller is configured to calculate, based on the ambient temperature and on a model for the heat exchanger, a predicted coolant temperature, and to compare the predicted coolant temperature to the actual coolant temperature. The controller is further configured to provide an alert based at least in part on the comparison.

16 Claims, 4 Drawing Sheets

SYSTEMS AND METHODS FOR MONITORING THE PERFORMANCE OF A HEAT EXCHANGER

TECHNICAL FIELD

The present disclosure relates to a machine with a cooling system and, more particularly, to systems and methods for monitoring the performance of a heat exchanger of the cooling system.

BACKGROUND

Machines that perform work on a site—such as haul trucks, graders, mining trucks, or excavators—typically have combustion engines or other components that may overheat during operation. Overheating may decrease the useful life of the machine's components, damage the components or the machine, and/or result in downtime hurting productivity. To combat overheating, these machines usually have cooling systems that carry heat away from the components susceptible to overheating.

For example, a typical cooling system may circulate a fluid coolant—such as air, oil, or water—through passages of the machine's engine. The coolant may absorb heat from the engine, thereby cooling the engine and preventing it from overheating. The coolant may then pass through a heat exchanger, such as a radiator. A fan pushes or pulls air through channels of the heat exchanger, which removes heat from the coolant so that it can be recirculated to continue cooling the engine.

Cooling systems, however, can sometimes malfunction, causing the overheating-related problems mentioned above. U.S. Pat. No. 8,370,052 to Lin et al. ("the '052 application") describes an algorithm to diagnose faults in a cooling system. The '052 application's algorithm compares the actual coolant temperature during engine start-up to a predicted coolant temperature that should occur if no cooling system error is present, to identify a cooling system fault condition. If a fault is detected, the algorithm runs the fan and checks whether the coolant temperature changes substantially, which the '052 application contends, allows a thermostat error to be distinguished from a vehicle configuration error.

Although the '052 application's technique may help identify a problem with the cooling system, it may nonetheless be deficient. For example, some types of cooling system faults may not manifest at startup, but at other operating conditions. And while the '052 application algorithm may detect an error with the thermostat, other types of cooling system faults may occur that the algorithm cannot detect.

For example, over time, dirt, dust, and other debris may accumulate within the channels of the heat exchanger, particularly on machines operating in dusty environments like landfills, mines, or excavation sites. The accumulation of debris may degrade the performance of the machine's cooling system, making the machine more likely to overheat. If unchecked for long enough, the channels and/or core of the heat exchanger may become plugged, preventing the ambient air from circulating through the channels and removing heat from the coolant. The debris can eventually harden and become difficult to remove, requiring more costly maintenance or replacement of a heat exchanger that might still have remaining useful life if the plugging had been identified earlier.

This disclosure is directed to overcoming one or more of the problems set forth above and/or other problems with existing systems and methods for monitoring the performance of cooling systems.

SUMMARY

One aspect of the disclosure is directed to a machine including a power source and a cooling system configured to circulate coolant between the power source and a heat exchanger. The cooling system may include a first sensor configured to sense an ambient temperature and provide a first signal indicative of the ambient temperature. The cooling system may include a second sensor configured to sense an actual temperature of the coolant and to provide a second signal indicative of the actual coolant temperature. The cooling system may further include a controller in communication with the first and second sensors to receive the first and second signals. The controller may be configured to calculate, based on the ambient temperature and on a model for the heat exchanger, a predicted coolant temperature, and to compare the predicted coolant temperature to the actual coolant temperature. The controller may be further configured to provide an alert based at least in part on the comparison.

Another aspect of the disclosure is directed to a method for monitoring performance of a heat exchanger of a cooling system of a machine having a power source. The method may include circulating, by the cooling system, coolant between the power source and the heat exchanger. The method may further include sensing an ambient temperature and sensing an actual temperature of the coolant. The method may further include a controller, associated with the cooling system, calculating, based on the ambient temperature and on a model for the heat exchanger, a predicted coolant temperature. The method may further include comparing the predicted coolant temperature to the actual coolant temperature. The method may further include providing an alert based at least in part on the comparison.

Yet another aspect of the disclosure is directed a cooling system for a machine. The cooling system may circulate coolant between a power source of the machine and a heat exchanger of the cooling system. The cooling system may include a first sensor configured to sense an ambient temperature and provide a first signal indicative of the ambient temperature. The cooling system may include a second sensor configured to sense an actual temperature of the coolant and to provide a second signal indicative of the actual coolant temperature. The cooling system may further include a controller in communication with the first and second sensors to receive the first and second signals. The controller may be configured to calculate, based on the ambient temperature and on a model for the heat exchanger, a predicted coolant temperature, and to compare the predicted coolant temperature to the actual coolant temperature. The controller may be further configured to provide an alert based at least in part on the comparison.

DETAILED DESCRIPTION

Figure 1:
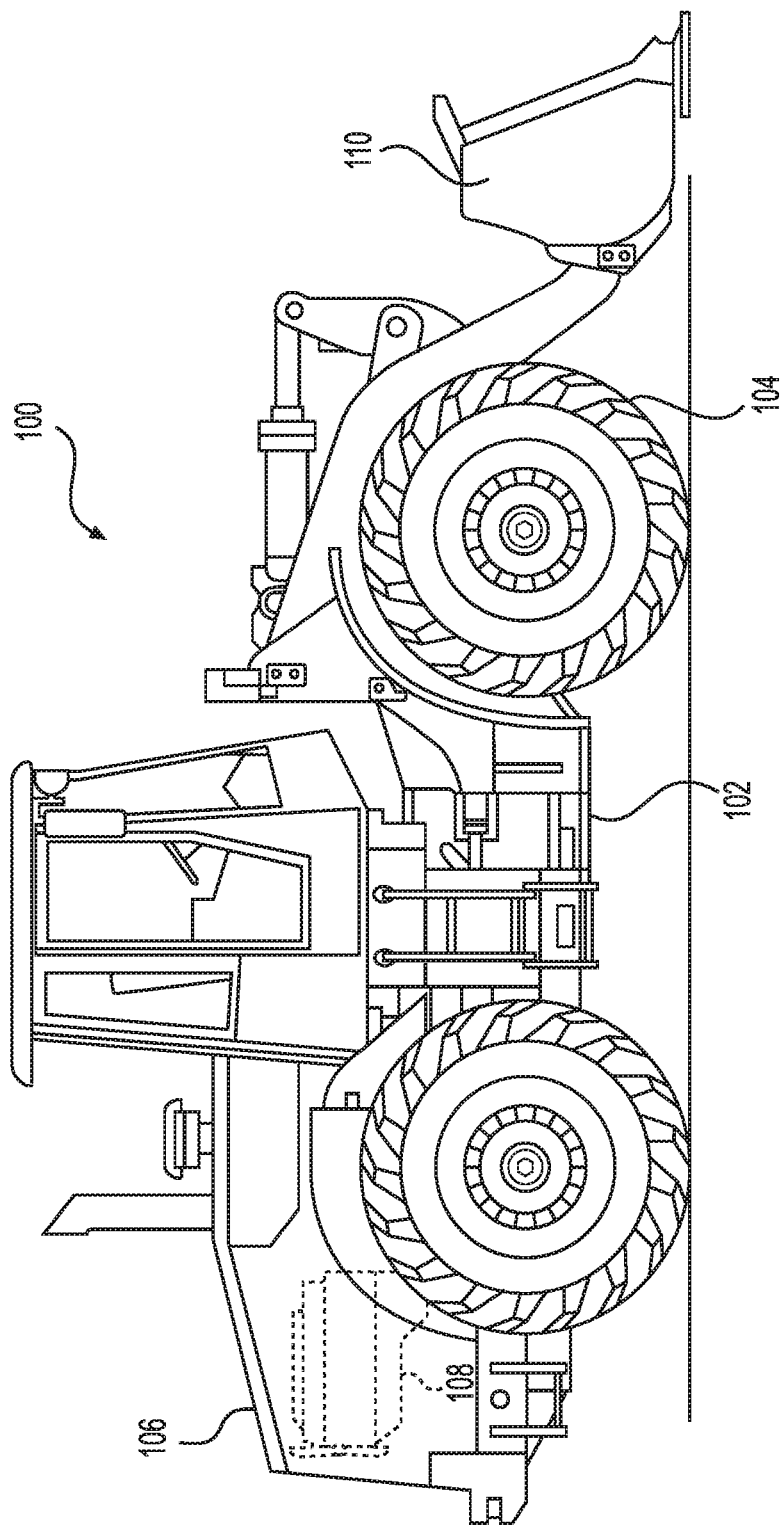
FIG. 1 is an illustration of an exemplary disclosed machine.

FIG. 1 shows an exemplary machine 100. In this example, machine 100 is a wheel loader. But machine 100 may embody any type of machine that performs work on a site, such as an articulated haul truck, a motor grader, a mining truck, a loader, an excavator, or a grader. Alternatively, machine 100 may embody a stationary system, such as a power-generation system or a fluid-pumping system. In the example shown, machine 100 may include, among other components, a chassis 102 supported by traction devices 104 (e.g., wheels), a power source enclosure 106 mounted to chassis 102, and a power source (e.g., combustion engine) 108 within enclosure 106 and operable to drive traction devices 104 to propel machine 100, and/or to power other systems of machine 100, such as one or more hydraulic cylinders or other mechanisms configured to actuate a work implement 110 connected to the machine 100.

Figure 2:
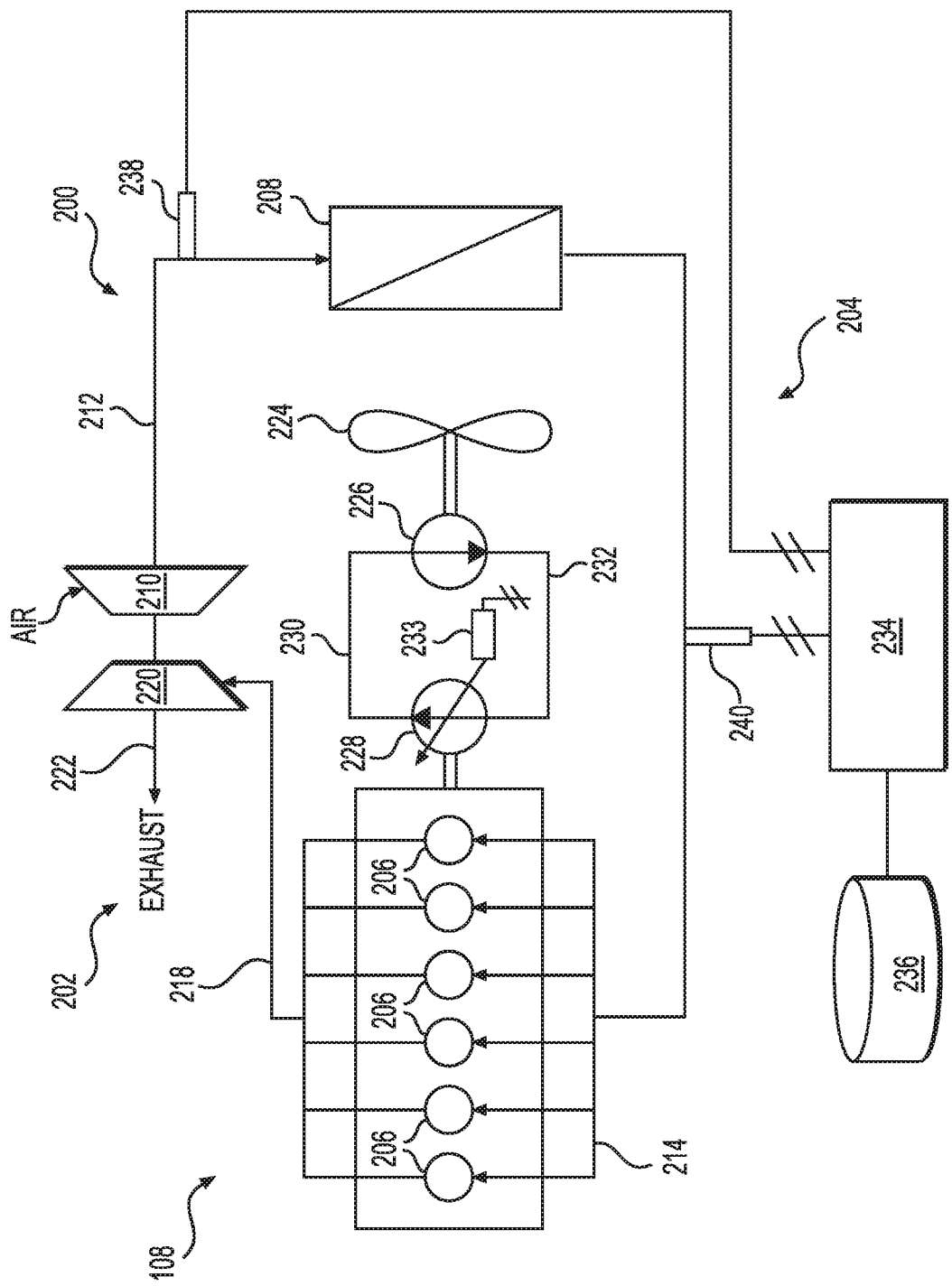
FIG. 2 is a diagram schematically illustrating certain systems of the machine of FIG. 1, including the disclosed cooling system.

FIG. 2 provides a diagram showing other exemplary systems of machine 100. Machine 100 may have, among other systems, an air-induction system 200, an exhaust system 202, and a cooling system 204.

Air-induction system 200 may be configured to intake ambient air, or to intake a mixture of ambient air and fuel, into power source 108 for combustion. Air induction system 200 may include components to condition and introduce compressed air into compression cylinders 206 of power source 108.

For example, air induction system 200 may include a heat exchanger 208, such as an air-to-air heat exchanger (e.g., a radiator), located downstream of one or more compressors 210. Compressor(s) 210 may fluidly connect to heat exchanger 208 via a passage 212, and may pressurize ambient inlet air. Passage 212 may direct the pressurized inlet air to heat exchanger 208. After transferring heat to heat exchanger 208—such as by the pressurized inlet air passing through channels (not shown) of heat exchanger 208, thereby reducing the temperature of the pressurized inlet air—the pressurized air may flow into cylinders 206 of power source 108 via an inlet manifold 214. Air induction system 200 may include different or additional components than those shown in FIG. 2 and described above. For example, configurations of air indication system 200 may have a throttle valve, variable-valve actuators associated with each cylinder 206, filtering components, compressor bypass components, and/or other known components (not shown) that may be selectively controlled to affect an air-to-fuel ratio of power source 108.

Exhaust system 202 may be configured to expel exhaust produced by the combustion process into the ambient atmosphere. Exhaust system 202 may include multiple components that condition and direct exhaust from cylinders 206 to the ambient atmosphere. For example, exhaust system 202 may include an exhaust passage 218, such as an exhaust manifold. Exhaust system 202 may also have one or more turbines 220 driven by exhaust flowing through exhaust passage 218, and an exhaust stack 222 connected to outlet(s) of turbine(s) 220. Like other systems in this description, exhaust system 202 may include different or additional components than those described above. For example, exhaust system 202 may have aftertreatment components, an exhaust compression or restriction brake, bypass components, an attenuation device, and/or other known components (not shown), if desired.

During operation of machine 100, combustion within power source 108 may heat various components of power source 108 to undesirable temperatures unless power source 108 is cooled. Cooling system 204 may maintain or reduce the temperature of power source 108 to improve efficiency, increase longevity, and/or prevent damage. For example, cooling system 204 may be configured to circulate a fluid coolant—such as oil, water, or air—through passages within power source 108. The circulating coolant may absorb heat from surfaces of power source 108, thereby cooling power source 108.

As shown in FIG. 2, cooling system 204 may include, among other components, a fan 224 near heat exchanger 208. In this example, fan 224 may be hydraulically actuated to push or pull air through channels (not shown) of heat exchanger 208, thereby cooling the hot air exiting the passages of power source 108 before it is recirculated to continue cooling power source 108. For example, a motor 226 may be connected to drive fan 224, and a pump 228 may be fluidly connected to drive motor 226 via a supply passage 230 and a return passage 232. In one embodiment, pump 228 may be a variable-displacement pump mechanically powered by power source 108. Pump 228 may pressurize fluid, such as hydraulic oil, within supply passage 230, and supply passage 230 may direct the pressurized fluid to motor 226. When passing through motor 226, the pressurized fluid may mechanically rotate motor 226, driving fan 224. After passing through motor 226, return passage 232 may return the pressurized fluid to pump 228. The speed of fan 224 may be adjusted by changing the displacement of pump 228 and/or of motor 226 via an adjustable displacement mechanism 233.

Although FIG. 2 shows cooling system 204 as a closed-loop system, cooling system 204 could alternatively have an open-loop configuration. In this case, pump 228 may be connected to motor 226 via an open-loop arrangement incorporating a reservoir tank for holding the coolant. In some scenarios, an open-loop configuration may help regulate the temperature of the coolant and prevent overheating.

Consistent with embodiments of this disclosure, cooling system 204 may have a cooling system controller 234 configured to control operations of cooling system 204. Controller 234 may be, for example, a hardware electronic control module (ECM) or electronic control unit (ECU) of machine 100. Controller 234 may comprise, for example, a core microcontroller, memory (e.g., RAM), storage (e.g., EEPROM or Flash) configured to perform the described functions of controller 234. Controller 234 may be dedicated to control the operations of cooling system 204 or may additionally control other systems of machine 100. Instead of, or in addition to, an ECM/ECU, controller 234 may embody a general computer microprocessor configured to execute computer program instructions (e.g., an application) stored in memory to perform the disclosed functions of controller 234. Controller 234 may include a memory, a secondary storage device, a processor, and/or any other computing components for running an application. Various other circuits may be associated with controller 234 such as power supply circuitry, signal conditioning circuitry, or solenoid driver circuitry.

Controller 234 may be communicatively coupled to control various components of machine 100 via wired or wireless (e.g., radio) connections. Controller 234 may receive inputs, in the form of electromagnetic signals, from components machine 100. Controller 234 may process the inputs—such as using a heat exchanger model described below—and provide corresponding output signals to components of machine 100.

For example, in the context of the disclosed method of monitoring cooling system performance, controller 234 may receive (or calculate) as inputs one or more of: engine speed, engine torque, fan speed, ambient temperature, actual coolant temperature, and/or altitude of machine 100. It is noted that "upstream" may refer to a point, away from a reference point, in the opposite direction from that in which the coolant circulates in cooling system 204. "Downstream" may refer to a point, away from a reference point, in the same direction as that in which the coolant circulates in cooling system 204.

As outputs, controller 234 may provide one or more of: a difference between actual coolant temperature and a predicted coolant temperature computed from the heat exchanger model based on the input data; an accumulated difference between the actual coolant temperature and the predicted coolant temperature; the actual coolant temperature; and/or the predicted coolant temperature.

Controller 234 may store data corresponding to one or more of the inputs in data storage 236 (e.g., memory or a database). Controller 236 may also be configured to store data corresponding to one or more of the outputs in data storage 236. Controller 234 may be configured to accumulate the data corresponding to the inputs and/or the outputs over time in data storage 236. Controller 234 may be further configured to analyze the accumulated data as described below.

As shown in FIG. 2, controller 234 may be associated with a first sensor 238 configured to sense a temperature of the ambient air and output a signal indicative of the same. For example, first sensor 234 may be located at or near compressor(s) 210, or in passage 212.

Controller 234 may also be associated with a second sensor 240 configured to sense a temperature of the coolant (i.e., the actual coolant temperature). In one embodiment, second sensor 240 may be positioned downstream of an outlet of heat exchanger 208 (or the aftercooler) and configured to output a signal indicative of the sensed temperature of the coolant downstream of the outlet (or aftercooler).

Controller 234 may be configured to, among other things, use the signals from first and second sensors 238, 240 to control cooling system 204. For example, controller 234 may be configured to control a flow rate of the coolant through cooling system 204. Controller 234 may also be configured to control a speed of fan 224, based in part on the signals from the first and second sensors 238, 240, by providing signals to displacement mechanism 233 to adjust a displacement of pump 228 (and/or motor 226).

Consistent with the disclosed embodiments, controller 234 may be configured to monitor the performance of heat exchanger 208 during operation of machine 100. In one embodiment, controller 234 may apply a heat exchanger model, to one or more of the inputs discussed above, to monitor the performance of heat exchanger 208.

Figure 3:
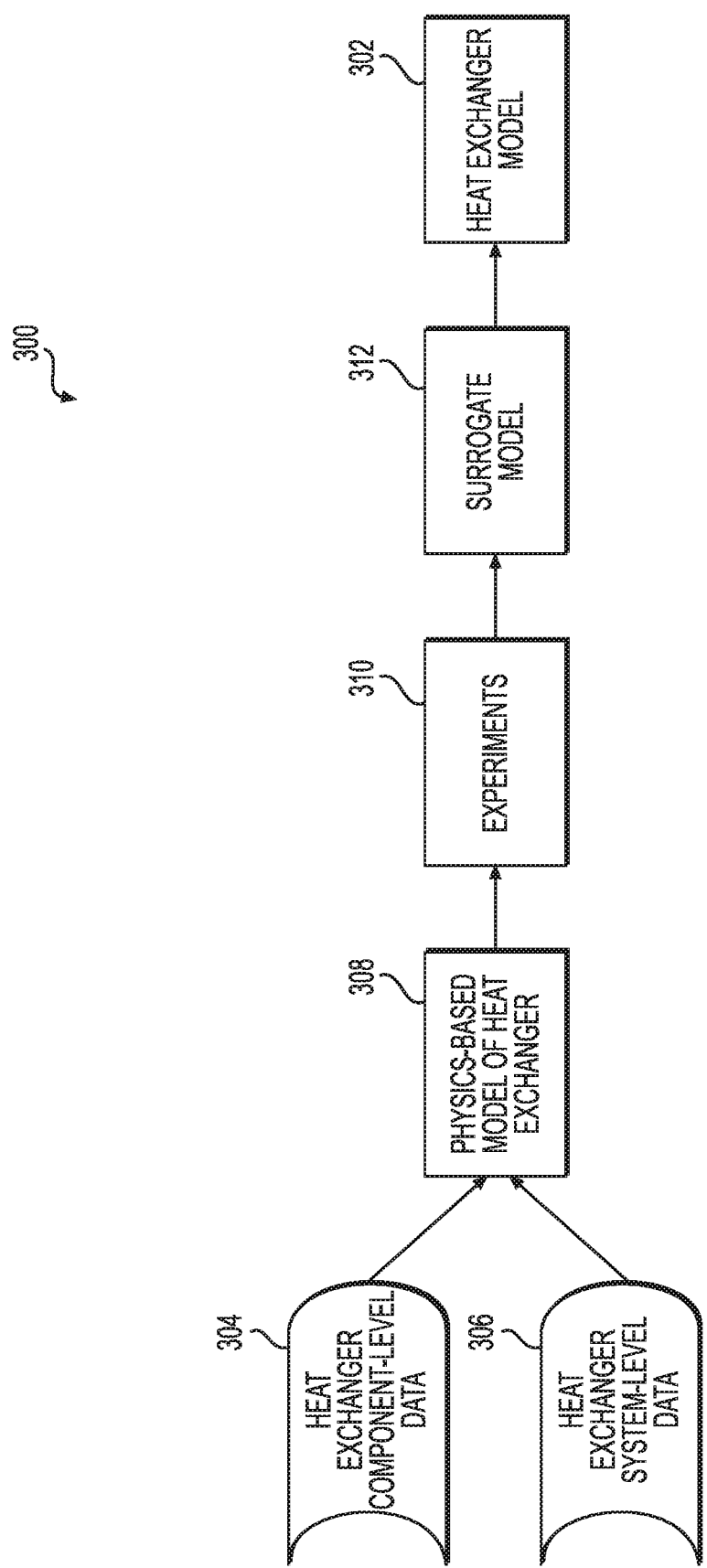
FIG. 3 is a flowchart illustrating an exemplary disclosed process for creating a heat exchanger model used by the cooling system of FIG. 2.

FIG. 3 shows an exemplary process 300 for creating a heat exchanger model 302, consistent with the disclosed embodiments. Heat exchanger model 302 may represent the performance of heat exchanger 208 in new and/or good condition (i.e., without plugging or other degradation). Heat exchanger model 302 may be configured to output a predicated coolant temperature from one or more inputs to controller 234, including engine speed, engine torque, fan speed, ambient temperature, actual coolant temperature, and/or altitude.

Process 300 may use heat exchanger component-level data 304 and heat exchanger system-level data 306 to create heat exchanger model 302. Heat exchanger component-level data 304 may include, for example, performance data from engineering predictions, bench tests, and/or specifications of heat exchanger 208 as an isolated component, provided by the manufacturer or supplier of heat exchanger 208. On the other hand, heat exchanger system-level data 306 may include, for example, performance data from engineering predictions, lab tests, and/or field tests of heat exchanger 208 as a component operating within the broader cooling system 204 and/or air-induction system 200 of machine 100.

Heat exchanger component-level data 304 and heat exchanger system-level data 306 may be used to create a physics-based model 308 of heat exchanger 208 operating within cooling system 204 and/or air-induction system 200 of machine 100. In some examples, heat exchanger 208 may be considered part of cooling system 204 and/or part of air-induction system 200. Physics-based model 308 may be, for example, a computer-aided engineering model (CAE) model. As is known in the art, CAE modeling may use computer software to aid in engineering analysis, such as finite element analysis (FEA), computational fluid dynamics (CFD), multibody dynamics (MBD), and/or durability and optimization. Physics-based model 308 may be used to design experiments 310 for heat exchanger 208, and from design experiments 310 a surrogate model 312 may be created. Surrogate model 312 may be trained using supervised learning techniques—such as linear regression, random forests, a Gaussian process, support vector machines, deep neural networks, or other supervised learning techniques known in the art. After training surrogate model 312, it may be implemented on controller 234 as heat exchanger model 302.

Figure 4:
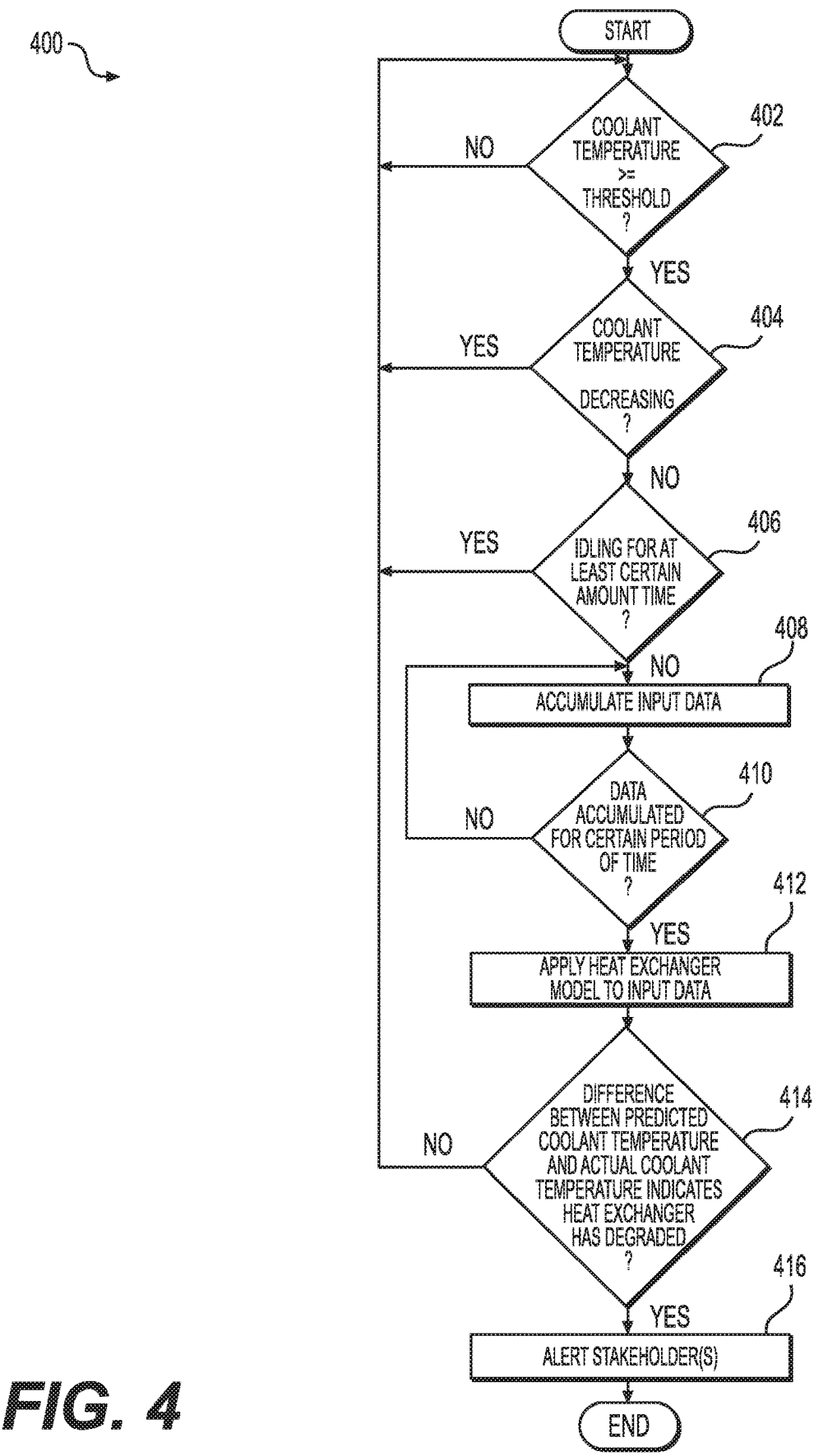
FIG. 4 is a flowchart illustrating an exemplary disclosed method for monitoring the performance of a heat exchanger of the cooling system of FIG. 2, using the heat exchanger model of FIG. 3.

FIG. 4 shows an exemplary method 400 for monitoring the performance of heat exchanger 208, using heat exchanger model 302, during operation of machine 100. Method 400 may be performed by controller 234.

Controller 234 may determine whether the actual coolant temperature has reached a threshold (step 402). If not (step 402—No), controller 234 may continue to monitor the actual coolant temperature until the actual coolant temperature reaches the threshold. The threshold may reflect a coolant temperature at which machine 100 is warmed up (e.g., 200° F.).

If the result of step 402 is yes, controller 234 may determine whether the actual coolant temperature is decreasing (step 404). This may correspond to a situation in which the coolant is cooling down. If so (step 402—Yes), controller 234 may return to step 402.

If the result of step 404 is no, controller 234 may determine whether power source 108 has been idling for at least a threshold amount of time (step 406), such as 15 minutes). If controller 234 determines that power source 108 has been idling for at least the threshold amount of time (step 406—Yes), controller 234 may return to step 402. A person of ordinary skill in the art will appreciate that when controller 234 reaches a yes result in step 406, machine 100 has been in an idling state such that machine 100 may not be considered in a working operating state. In the context of a wheel loader, an exemplary working state may be one in which machine 100 uses implement 110 to remove material and/or transport material from one location to another on a site. On the other hand, when controller 234 reaches a no result in step 406, machine 100 may be in a working operating state, such as the exemplary working state described above, because machine 100 has not been idling for the threshold amount of time (e.g., for 15 minutes or more) and its coolant is not cooling down.

If the result of step 406 is no, and thus machine 100 has reached a stable working operating state, controller 234 may begin to accumulate input data (step 408) for a certain amount of time (step 410). That is, controller may begin to accumulate input data once machine 100 is determined to have warmed up (step 402—Yes) and has not been idling for a threshold amount of time (step 402—No). In the case of a wheel loader, this may correspond, for example, to a working state in which machine 100 is using implement 110 to move material on a site.

In one embodiment, this amount of time may be selected to ensure that controller 234 has accumulated enough input data to make a reliable determination about the performance of heat exchanger 208 and/or cooling system 204. Step 408 may involve, for example, controller 234 accumulating in storage 236 data corresponding to one or more of the controller inputs discussed above (i.e., engine speed, engine torque, fan speed, ambient temperature, actual coolant temperature, and/or altitude).

Having accumulated the input data for the certain amount of time, controller 234 may apply heat exchanger model 302 to the accumulated input data (step 412). In applying heat exchanger model 302, controller 234 may calculate a predicted coolant temperature given the input data. As explained, heat exchanger model 302 may represent the performance of heat exchanger 208 in good and/or new condition (i.e., without plugging or other degradation). Thus, the predicated coolant temperature may correspond to the expected coolant temperature under the input conditions with heat exchanger 208 performing properly.

Controller 234 may determine whether a difference between the predicted coolant temperature and the actual coolant temperature indicates that the performance of heat exchanger 208 has degraded (and/or may be or become plugged) (step 414). Embodiments of step 414 may include any type of comparison by the controller of the predicted coolant temperature to the actual coolant temperature. Examples include:

(1) Controller 234 may determine whether a difference between the predicted and actual coolant temperatures is greater than a threshold (e.g., 10° F.). If the difference is greater than the threshold, controller 234 may determine that heat exchanger 208 has become plugged or otherwise degraded.

(2) Over time, controller 234 may identify instances in which the difference between the predicted and actual coolant temperatures is greater than the threshold. If controller 234 identifies a sufficient number of instances in which the difference is greater than the threshold, over a certain amount of time (10 times in 30 minutes), controller 234 may determine that heat exchanger 208 has become plugged or otherwise degraded.

(3) Controller 234 may average the actual coolant temperature over time and determine whether a difference between the average actual coolant temperature and a predicted average coolant temperature is greater than the threshold. If the difference between the average actual coolant temperature and predicted average coolant temperature is greater than the threshold, controller 234 may determine that heat exchanger 208 has become plugged or otherwise degraded.

(4) Controller 234 may determine whether the number of instances in which the difference between the predicted and actual coolant temperatures is greater than a threshold increases with time. If so, controller 234 may determine that heat exchanger 208 has become plugged or otherwise degraded.

(5) Controller 234 may determine whether the number of instances in which the difference between the predicted and actual coolant temperatures is greater than the threshold increases over time. If so, controller 234 may determine that heat exchanger 208 has become plugged or otherwise degraded.

(6) Controller 234 may determine whether a difference between the predicted coolant temperature and the actual coolant temperature increases with time.

The exemplary above-numbered determinations, alone or in combination, may indicate that the performance of heat exchanger 208 has degraded and/or that heat exchanger 208 has become or may become plugged.

The threshold(s) used in step 414 may be increased, decreased, or otherwise calibrated by a stakeholder associated with machine 100 (e.g., a fleet manager, machine owner, or machine operator) to flag a desired degree of degradation and/or plugging of heat exchanger 208. For example, a stakeholder may set the threshold(s) higher if the stakeholder prioritizes productivity over the risk of reducing the useful life of heat exchanger 208, damaging heat exchanger 208 or other components, losing productivity if heat exchanger 208 fails, etc. On other hand, if the stakeholder prioritizes minimizing such risks at the potential expense of productivity, the stakeholder may set the threshold(s) lower.

If the result of step 414 is yes, controller 234 may alert one or more stakeholders associated with machine 100 (step 416). For example, controller 234 may activate a diagnostic indicator light (not shown) in the cabin of machine 100 to alert the operator of an issue with heat exchanger 208. Controller 234 may alternatively or additionally provide—via cellular, satellite, and/or other wireless communication networks—an alert to an off-board computing system (not shown) indicating an issue with heat exchanger 208. The offboard system may, in turn, notify the owner of machine 100, a fleet manager responsible for machine 100, etc. The alert may embody, for example an email, a text message, a mobile device notification, or other message sent to the stakeholder.

An alternate method of alerting one or more stakeholders associated with machine 100 may include controller 234 automatically obtaining a weather forecast (e.g., a five-day forecast) for the location of machine 100 using the global positioning system (GPS) coordinates from a GPS device of machine 100. Controller 234 determine whether the ambient temperature capability of machine 100 is greater than or equal to the forecasted temperatures to identify days during which machine 100 is predicted to overheat. Controller 234 may similarly cause notification of the stakeholder(s) regarding the days in which machine 100 is predicted to overheat. The ambient capability of machine 100 may refer to the maximum ambient temperature in which machine 100 is capable of operating without overheating given the current condition of heat exchanger 208.

INDUSTRIAL APPLICABILITY

This disclosure relates to a cooling system for a machine, such as cooling system 204 of machine 100 described above. More particularly, this disclosure relates to methods and systems for monitoring the performance of cooling system 204 to identify potential plugging or other degradation of heat exchanger 208 and alert one or more stakeholders associated with machine 100.

As explained, debris may plug the channels of heat exchanger 208, degrading the performance of cooling system 204. Plugging may be exacerbated in dusty or dirty environments, such as the sites on which machines like machine 100 operate. This may lead to a reduction in useful life of heat exchanger 204, damage to heat exchanger 208 or other components of machine 100, inefficient performance of machine 100, and/or lost productivity from downtime.

By accumulating input data during a steady working operating state of machine 100 other than idling and applying heat exchanger model 302 to the accumulated input data, controller 234 may determine whether heat exchanger 208's performance degrades, potentially indicating plugging of its channels. Specifically, controller 234 may determine whether a difference between the coolant temperature predicted by model 302 and the actual coolant temperature indicates that the performance of heat exchanger 208 has degraded. In this manner, controller 234 may alert any relevant stakeholders of machine 100—such as the machine owner, operator, or fleet manager—of a potential heat exchanger problem. And the alert may occur before the performance of heat exchanger 208 degrades to the point that it causes one or more of the problems noted above.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A machine, comprising:
   a power source;
   a cooling system configured to circulate coolant between the power source and a heat exchanger, the cooling system comprising:
   a first sensor configured to sense an ambient temperature and provide a first signal indicative of the ambient temperature;
   a second sensor configured to sense an actual temperature of the coolant and to provide a second signal indicative of the actual coolant temperature; and
   a controller in communication with the first and second sensors to receive the first and second signals, the controller being configured to:
   determine, based on the ambient temperature and on a model for the heat exchanger, a predicted coolant temperature;
   compare, over a period of time, the predicted coolant temperature to the actual coolant temperature;
   determine, based on the comparison, that the actual coolant temperature is greater than the predicted coolant temperature by an amount that increases over the period of time, the amount of increase corresponding to a degradation of performance of the heat exchanger; and
   provide an alert based at least in part on the determination that the actual coolant temperature is greater than the predicted coolant temperature and on the amount of the increase being greater than a stakeholder-set threshold,
   wherein, to determine that the actual coolant temperature is greater than the predicted coolant temperature by the amount that increases over the period of time, the controller is further configured to:
   average the actual coolant temperature over time; and
   determine that the average actual coolant temperature is greater than a predicted average coolant temperature by the threshold.

2. The machine of claim 1, wherein the controller is configured to determine the predicted coolant temperature based further on one or more of: a speed of the power source, a torque of the power source, a speed of a fan of the cooling system, or an altitude of the machine.

3. The machine of claim 1, wherein the model for the heat exchanger is a physics-based model of the heat exchanger, the physics-based model being based on performance data for the heat exchanger.

4. The machine of claim 1, wherein, to determine that a difference between the predicted coolant temperature and the actual coolant temperature is greater than the threshold, the controller is configured to determine that a number of instances in which the difference between the predicted coolant temperature and the actual coolant temperatures is greater than the threshold.

5. The machine of claim 4, wherein, to determine that a difference between the predicted coolant temperature and the actual coolant temperature is greater than the threshold, the controller is configured to determine that the number of instances increases with time.

6. The machine of claim 1, wherein providing an alert includes one or more of: activating a diagnostic light in a cabin of the machine and sending an electronic notification to an owner, operator, or fleet manager of the machine.

7. A method for monitoring performance of a heat exchanger of a cooling system of a machine, the machine having a power source, the method comprising:
   circulating, by the cooling system, coolant between the power source and the heat exchanger;
   sensing, using a first sensor, an ambient temperature;
   sensing, using a second sensor, an actual temperature of the coolant; and
   by a controller associated with the cooling system:
   determining, based on the ambient temperature and on a model for the heat exchanger, a predicted coolant temperature;
   comparing, over a period of time, the predicted coolant temperature to the actual coolant temperature;
   determining, based on the comparison, that the actual coolant temperature is greater than the predicted coolant temperature by an amount that increases over the period of time, the increase corresponding to a degradation of performance of the heat exchanger; and
   providing an alert based at least in part on the determination that the actual coolant temperature is greater than the predicted coolant temperature and on the amount of the increase being greater than a stakeholder-set threshold,
   wherein determining that the actual coolant temperature is greater than the predicted coolant temperature by the amount that increases over the period of time includes:
   averaging the actual coolant temperature over time; and
   determining that the average actual coolant temperature is greater than a predicted average coolant temperature by the threshold.

8. The method of claim 7, wherein determining the predicted coolant temperature includes determining the predicted coolant temperature based on one or more of: a speed of the power source, a torque of the power source, a speed of a fan of the cooling system, or an altitude of the machine.

9. The method of claim 7, wherein the model for the heat exchanger is a physics-based model of the heat exchanger, the physics-based model being based on performance data for the heat exchanger.

10. The method of claim 7, wherein determining that a difference between the predicted coolant temperature and the actual coolant temperature is greater than the threshold includes determining that a number of instances in which the difference between the predicted coolant temperature and the actual coolant temperatures is greater than the threshold.

11. The method of claim 10, wherein determining that a difference between the predicted coolant temperature and the actual coolant temperature is greater than the threshold includes determining that the number of instances increases with time.

12. The method of claim 7, wherein providing an alert includes one or more of: activating a diagnostic light in a cabin of the machine, sending an electronic notification to an owner of the machine, or sending an electronic notification to a fleet manager.

13. A cooling system for a machine, the cooling system circulating coolant between a power source of the machine and a heat exchanger of the cooling system, the cooling system comprising:
   a first sensor configured to sense an ambient temperature and provide a first signal indicative of the ambient temperature;
   a second sensor configured to sense an actual temperature of the coolant and to provide a second signal indicative of the actual coolant temperature; and
   a controller in communication with the first and second sensors to receive the first and second signals, the controller being configured to:
      determine, based on the ambient temperature and on a model for the heat exchanger, a predicted coolant temperature;
      compare, over a period of time, the predicted coolant temperature to the actual coolant temperature is greater than a threshold; and
      determine, based on the comparison, that the actual coolant temperature is greater than the predicted coolant temperature by an amount that increases over the period of time, the increase corresponding to a degradation of performance of the heat exchanger; and
      provide an alert based at least in part on the determination that the actual coolant temperature is greater than the predicted coolant temperature and on the amount of the increase being greater than a stakeholder-set threshold,
      wherein, to determine that the actual coolant temperature is greater than the predicted coolant temperature by the amount that increases over the period of time, the controller is further configured to:
      average the actual coolant temperature over time; and
      determine that the average actual coolant temperature is greater than a predicted average coolant temperature by the threshold.

14. The cooling system of claim 13, wherein the controller is configured to determine the predicted coolant temperature based further on one or more of: a speed of the power source, a torque of the power source, a speed of a fan of the cooling system, or an altitude of the machine.

15. The machine of claim 1, wherein the alert comprises an electronic message sent to the stakeholder, the stakeholder being associated with the machine.

16. The cooling system of claim 13, wherein the alert comprises an electronic message sent to the stakeholder, the stakeholder being associated with the machine.

* * * * *